United States Patent
Ghosh et al.

(10) Patent No.: US 10,404,468 B2
(45) Date of Patent: Sep. 3, 2019

(54) TECHNOLOGIES FOR CCM ENCRYPTION WITH 64-BIT BLOCK CIPHERS

(71) Applicant: Intel Corporation, Santa Clara, CA (US)

(72) Inventors: Santosh Ghosh, Hillsboro, OR (US); Manoj R. Sastry, Portland, OR (US); Jesse Walker, Hillsboro, OR (US); Li Zhao, Beaverton, OR (US); Rafael Misoczki, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 262 days.

(21) Appl. No.: 15/351,606

(22) Filed: Nov. 15, 2016

(65) Prior Publication Data

US 2018/0139051 A1 May 17, 2018

(51) Int. Cl.
| | |
|---|---|
| *G06F 11/30* | (2006.01) |
| *G06F 12/14* | (2006.01) |
| *H04L 9/32* | (2006.01) |
| *H04L 9/06* | (2006.01) |

(52) U.S. Cl.
CPC .......... *H04L 9/3242* (2013.01); *H04L 9/0637* (2013.01); *H04L 9/0643* (2013.01)

(58) Field of Classification Search
CPC .... H04L 9/3242; H04L 9/0637; H04L 9/0643
See application file for complete search history.

(56) References Cited

U.S. PATENT DOCUMENTS

| | | | | |
|---|---|---|---|---|
| 2005/0154882 A1* | 7/2005 | Struik | ...................... | H04L 9/00 713/160 |
| 2007/0177627 A1* | 8/2007 | Raju | ..................... | H04J 3/1605 370/469 |
| 2008/0046039 A1* | 2/2008 | Corndorf | .............. | H04L 9/0844 607/60 |

OTHER PUBLICATIONS

Miles Smid, Elaine Barker, David Balenson, Martha Haykin, Message Authentication Code (MAC) Validation System: Requirements and Procedures, May 1988, Computer Science and Technology, NBS Special Publication 500-156 (Year: 1988).*

(Continued)

*Primary Examiner* — Trong H Nguyen
*Assistant Examiner* — Amie C. Lin
(74) *Attorney, Agent, or Firm* — Barnes & Thornburg LLP

(57) ABSTRACT

Technologies for counter with CBC-MAC (CCM) mode encryption include a computing device that performs a CBC-MAC authentication operation on a message with an encryption key, using a 64-bit block cipher to generate a message authentication code. The computing device generates a first 64-bit authentication block including an 8-bit flag field and a length field of between 11 and 32 bits. The flag field indicates the length of the length field. Performing the CBC-MAC authentication operation includes formatting the message into one or more 64-bit authentication blocks. The computing device performs a counter mode encryption operation on the message with the encryption key using the 64-bit block cipher to generate a cipher text. Performing the counter mode encryption includes generating multiple 64-bit keystream blocks. The computing device generates an authentication tag based on the message authentication code and a first keystream block of keystream blocks. Other embodiments are described and claimed.

22 Claims, 4 Drawing Sheets

(56) References Cited

OTHER PUBLICATIONS

R. Housley, Using Advanced Encryption Standard (AES) CCM Mode with IPsec Encapsulating Security Payload (ESP), Dec. 2005 (Year: 2005).*

* cited by examiner

TECHNOLOGIES FOR CCM ENCRYPTION WITH 64-BIT BLOCK CIPHERS

BACKGROUND

Current computing devices use encryption to protect sensitive communications and other data. Counter with cipher block chaining-message authentication code (CCM) is a popular generic authenticated encryption block cipher mode used in, for example, Bluetooth® LE and Wi-Fi® communication protocols. The CCM cipher mode provides confidentiality and ensures the authenticity of the underlying data, using a block cipher algorithm. The CCM cipher mode has been specified only for 128-bit block ciphers such as AES.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
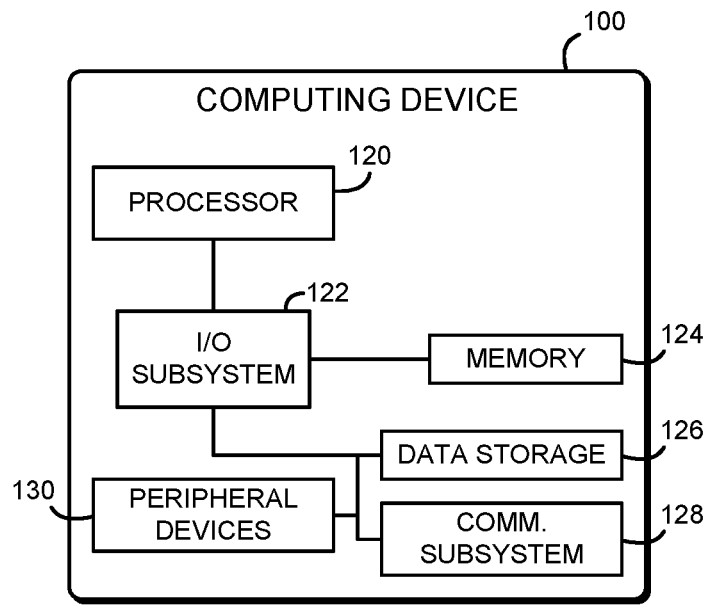
FIG. 1 is a simplified block diagram of at least one embodiment of a computing device for CCM encryption with 64-bit block ciphers.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for CCM encryption includes a processor 120, an I/O subsystem 122, a memory 124, a data storage device 126, and a communications subsystem 128. In use, as described below, the computing device 100 performs a CCM mode authenticated encryption operation on a message using a 64-bit block cipher and with parameters and flags adapted to a 64-bit block size. The CCM mode encryption operation includes performing a cipher block chaining-message authentication code (CBC-MAC) authentication operation and a counter mode (CTR) encryption operation on the message, using the same 64-bit block cipher algorithm and associated encryption key. Thus, the computing device 100 may allow CCM mode encryption to be used with a lightweight 64-bit block cipher having a smaller footprint compared to AES. Therefore, the CCM encryption performed by the computing device 100 may be suitable for resource-constrained devices such as Internet of Things (IoT) devices, wearables, or other small devices. Additionally, as described further below, the computing device 100 may be configured for maximum message sizes between $2^{11}$ and $2^{32}$ bytes, and the maximum message size may be adjusted in 2× increments. Thus, the maximum message size supported by the computing device 100 (and, relatedly, the number of messages that may be encrypted with the same key) is more granular and flexible than AES-CCM, which requires the maximum message size to be adjusted in 256× increments. Thus, by allowing flexible maximum message sizes, the CCM encryption performed by the computing device 100 may also be suitable for resource-constrained devices.

The computing device 100 may be embodied as any type of device capable of performing the functions described herein. For example, the computing device 100 may be embodied as, without limitation, a computer, a mobile computing device, a smartphone, a wearable computing device, a laptop computer, a notebook computer, a tablet computer, a workstation, a server, a multiprocessor system, an IoT gateway, and/or a consumer electronic device. As shown in FIG. 1, the illustrative computing device 100 includes the processor 120, the I/O subsystem 122, the memory 124, and the data storage device 126. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 128, which may be embodied as any communication circuit, device, or collection thereof, capable of enabling communications between the computing device 100 and other remote devices over a computer network (not shown). The communications subsystem 128 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The computing device 100 may further include one or more peripheral devices 130. The peripheral devices 130 may include any number of additional input/output devices, interface devices, and/or other peripheral devices. For example, in some embodiments, the peripheral devices 130 may include a touch screen, graphics circuitry, an audio device, a microphone, a camera, a keyboard, a mouse, a network interface, and/or other input/output devices, interface devices, and/or peripheral devices.

Figure 2:
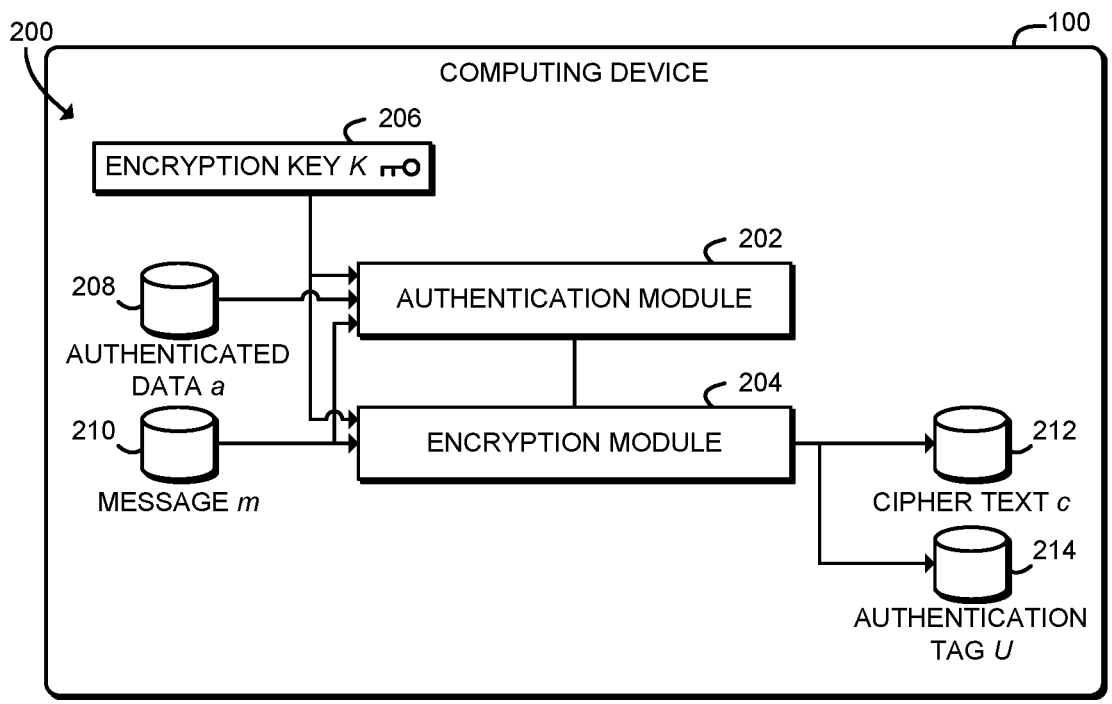
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes an authentication module 202 and an encryption module 204. The various module of the environment 200 may be embodied as hardware, firmware, software, or a combination thereof. As such, in some embodiments, one or more of the modules of the environment 200 may be embodied as circuitry or collection of electrical devices (e.g., authentication circuitry 202 and/or encryption circuitry 204). It should be appreciated that, in such embodiments, one or more of the authentication circuitry 202 and/or the encryption circuitry 204 may form a portion of the processor 120, the I/O subsystem 122, and/or other components of the computing device 100. Additionally, in some embodiments, one or more of the illustrative modules may form a portion of another module and/or one or more of the illustrative modules may be independent of one another.

The authentication module 202 is configured to perform a cipher block chaining message authentication code (CBC-MAC) authentication operation on a message m 210 with an encryption key K 206, using a 64-bit block cipher to generate a message authentication code T. In some embodiments, the CBC-MAC authentication operation is further performed on additional authenticated data a 208. As described further below, performing the CBC-MAC authentication operation may include generating a 64-bit authentication block $B_0$ that includes a flag field F, a nonce field N, and a message length field l(m). The message length field l(m) is indicative of a length of the message m 210 in bytes. The flag field F has a length of 8 bits, the message length field l(m) has a length L of between 11 and 32 bits, inclusive, and the nonce field N has a length of 56 minus the length L bits. In some embodiments, performing the CBC-MAC authentication operation may include formatting the message m 210 and, if present, the additional authentication data a 208 into one or more 64-bit authentication blocks $B_i$.

The encryption module 204 is configured to perform a counter mode encryption operation on the message m 210 with the encryption key K 206 using the 64-bit block cipher to generate a cipher text c 212. As described further below, performing the counter mode encryption operation includes generating a sequence of 64-bit keystream blocks $S_0$ to $S_m$. The encryption module 204 is further configured to generate an authentication tag U 214 based on the message authentication code T and the keystream block $S_0$.

Figure 3:
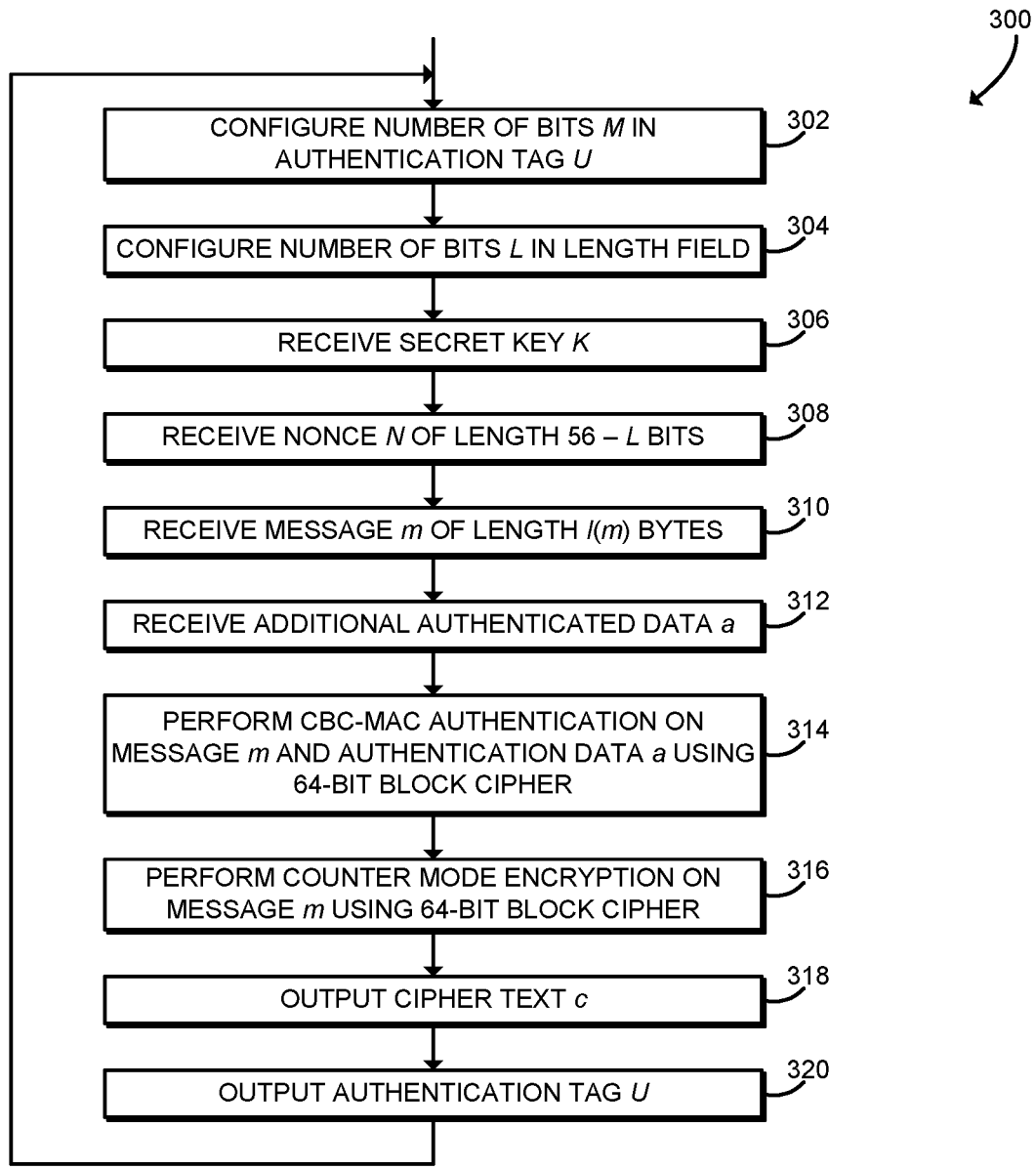
FIG. 3 is a simplified flow diagram of at least one embodiment of a method for CCM encryption that may be executed by the computing device of FIGS. 1 and 2.

Referring now to FIG. 3, in use, the computing device 100 may execute a method 300 for CCM encryption with a 64-bit block cipher. It should be appreciated that, in some embodiments, the operations of the method 300 may be performed by one or more modules of the environment 200 of the computing device 100 as shown in FIG. 2. The method 300 begins in block 302, in which the computing device 100 configures the number of bits M in the authentication tag U 214. In the illustrative embodiment, valid values for the number of bits M include 32, 48, and 64 bits. As described further below, the number of bits M is encoded in a flag field of the authentication block $B_0$ that is used in the CBC-MAC authentication operation. The number of authentication bits M may be configured for each invocation of the CCM encryption operation, for each application using the CCM encryption operation, or, in some embodiments, may be hard-coded or otherwise configured ahead of time.

In block 304, the computing device 100 configures the number of bits L to be used in the message length l(m) field of the authentication block $B_0$. In the illustrative embodiment, valid values for the number of bits L include 11 bits to 32 bits, inclusive. The message length l(m) field includes the number of bytes in the message m 210. Thus, the maximum message length l(m) may vary from $2^{11}$ bytes (2 kB) to $2^{32}$ bytes (4 GB). Additionally, because the message length l(m) field may vary from 11 bits to 32 bits, the maximum message length l(m) may be varied in 2× increments. The computing device 100 may encrypt $2^{32-k}$ messages using the same encryption key. As described further below, the number of bits L in the message length l(m) field is encoded in a flag field of the authentication block $B_0$ and in a flag field of each counter block $A_i$ generated by the computing device 100.

In block 306, the computing device 100 receives a secret encryption key K 206. The secret encryption key K 206 may be embodied as any encryption key appropriate for the 64-bit block cipher algorithm used by the computing device 100, and may be distributed to the computing device 100 using any appropriate mechanism.

In block 308, the computing device 100 receives a nonce N. The nonce N may be embodied as a unique binary value with a length of 56 bits minus the number of bits L. Thus, the length of the nonce N may vary between 45 and 24 bits, inclusive.

In block 310, the computing device 100 receives a message m 210. The message m 210 may be embodied as a string of bytes (or octets) including a clear text message. The message m 210 has a length l(m), in bytes. The length l(m) must greater than or equal to zero and less than $2^L$. Thus, the length l(m) may be encoded in a length field of L bits. In block 312, the computing device 100 may receive additional authenticated data a 208. The additional authenticated data a 208 may be embodied as a string of bytes (or octets) including data that is to be authenticated but not encrypted. The additional authenticated data a 208 has a length l(a), which must be greater than or equal to zero and less than $2^{32}$. The nonce N, the message m 210, and the additional authentication data a 208 may be received by the computing device 100, for example, as arguments to a function invoked by an application, as arguments supplied to hardware of the computing device 100 (e.g., as arguments to a processor instruction executed by the processor 120), or in any other appropriate format.

In block 314, the computing device 100 performs a CBC-MAC authentication operation on the message m 210 and the authentication data a 208 using a 64-bit block cipher algorithm with the encryption key K 206. The CBC-MAC authentication operation generates a message authentication code (MAC) T over the message m 210 and the authentication data a 208. The computing device 100 may use any appropriate 64-bit block cipher algorithm to perform the CBC-MAC authentication operation. For example, in some embodiments the computing device 100 may perform a lightweight 64-bit block cipher algorithm such as SIMON, SPECK, or PRINCE. One potential embodiment of a method for performing the CBC-MAC authentication operation is described further below in connection with FIG. 4.

In block 316, the computing device 100 performs a counter mode encryption operation on the message m 210 using the 64-bit block cipher algorithm with the encryption key K 206. The counter mode encryption operation generates the cipher text c 212 and the authentication tag U 214. The counter mode encryption operation also generates the authentication tag U 214 based on the MAC T. The computing device 100 performs the counter mode encryption operation using the same 64-bit block cipher algorithm used for the CBC-MAC authentication operation. One potential embodiment of a method for performing the counter mode encryption operation is described further below in connection with FIG. 6.

In block 318, the computing device 100 outputs the cipher text c 212. The cipher text c 212 may be embodied as a string of encrypted data of length l(m) bytes. As described further below, the cipher text c 212 may be decrypted using the encryption key K 206. In block 320 the computing device 100 outputs the authentication tag U 214. The authentication tag U 214 may be embodied as a string of authentication data of length M bits. The authentication tag U 214 may be used by a recipient to verify the validity of the cipher text c 212. In some embodiments, the authentication tag U 214 may be combined with the cipher text c 212, for example by being concatenated to the end of the cipher text c 212. After outputting the cipher text c 212 and the authentication tag U 214, the method 300 loops back to block 302, in which the computing device 100 may perform additional CCM encryption operations.

Figure 4:
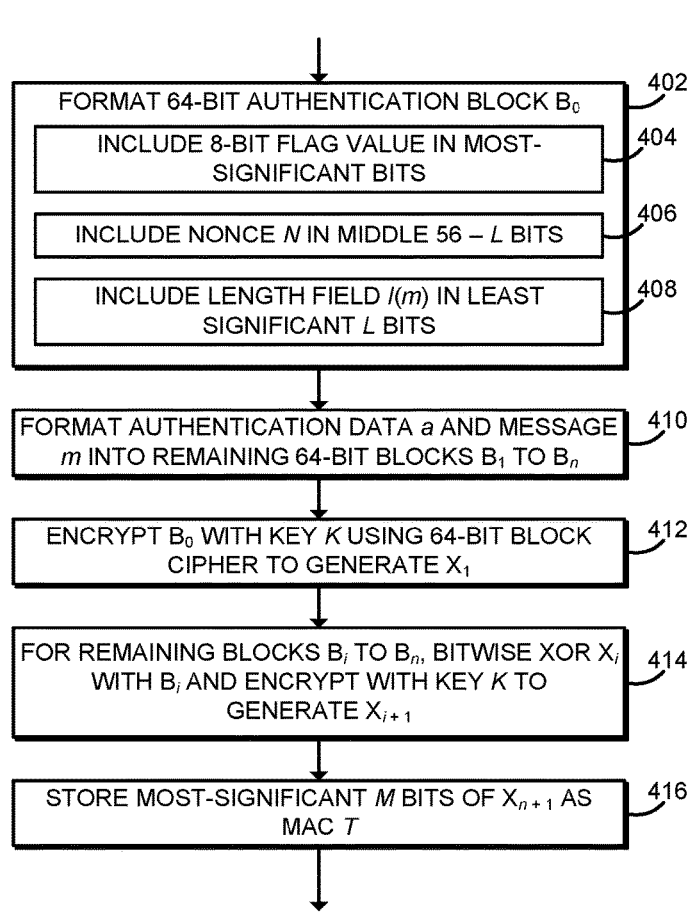
FIG. 4 is a simplified flow diagram of at least one embodiment of a method for data authentication that may be executed by the computing device of FIGS. 1 and 2.

Referring now to FIG. 4, in use, the computing device 100 may execute a method 400 for CBC-MAC authentication. The method 400 may be executed, for example, in connection with block 314 of FIG. 3, as described above. It should be appreciated that, in some embodiments, the operations of the method 400 may be performed by one or more modules of the environment 200 of the computing device 100 as shown in FIG. 2. The method 400 begins in block 402, in which the computing device 100 formats a 64-bit authentication block $B_0$. The authentication block $B_0$ may be embodied as a 64-bit data block that encodes parameters for the CCM encryption operation. One potential embodiment of the authentication block $B_0$ is described below in connection with FIG. 5. In block 404, the computing device 100 includes an 8-bit flag field F in the most-significant 8 bits of the authentication block $B_0$. The flag field F indicates whether additional authentication data a 208 is provided, the number of bits M in the authentication tag U 214, and the number of bits L in the length l(m) field. In block 406, the computing device 100 includes the nonce N in the middle 56−L bits of the authentication block $B_0$. In block 408, the computing device 100 includes the length l(m) field in the least-significant L bits of the authentication block $B_0$.

In block 410, the computing device 100 formats the additional authentication data a 208 and the message m 210 into a sequence of 64-bit authentication blocks $B_1$ to $B_n$. For example, the computing device 100 may apply a formatting function to transform the authentication data a 208 and the message m 210 into a sequence of complete 64-bit blocks. The computing device 100 applies the same encoding and padding rules used for AES-CCM to generate the authentication blocks $B_1$ to $B_n$. For example, in some embodiments, the computing device 100 may encode the length l(a) of the additional authentication data a 208 into one or more bytes, concatenate the encoded length l(a) and the additional authentication data a 208, and then insert a minimum number of '0' bits after the additional authentication data a 208 to pad to a whole number of 64-bit blocks. Similarly, the computing device 100 may format the message m 210 into a sequence of 64-bit blocks by inserting a minimum number of '0' bits after the message m 210 to pad to a whole number of 64-bit blocks.

In block 412, the computing device 100 encrypts the authentication block $B_0$ using a 64-bit block cipher to generate an intermediate value $X_1$. The encryption operation performed on block $B_0$ is illustrated by Equation 1, below. The function $E_{64}$ represents the 64-bit block cipher. As shown, the encryption key K 206 and the authentication block $B_0$ are input as parameters to the 64-bit block cipher $E_{64}$.

$$X_1 = E_{64}(K, B_0) \quad (1)$$

In block 414, for each block $B_i$ of the remaining authentication blocks $B_1$ to $B_n$, the computing device 100 bitwise XORs the intermediate value $X_i$ with the authentication block $B_i$ and encrypts that value with the encryption key K 206 to generate the intermediate value $X_{i+1}$. The encryption operation performed on each block $B_i$ is illustrated by Equation 2, below.

$$X_{i+1} = E_{64}(K, X_i \oplus B_i) \qquad (2)$$

In block 416, the computing device 100 stores the most-significant M bits of the intermediate value $X_{n+1}$ as the message authentication code (MAC) T. As described above, the intermediate value $X_{n+1}$ is generated as a function of the last authentication block $B_n$. As described further below, the computing device 100 may generate the authentication tag U 214 as a function of the MAC T. Thus, the computing device 100 may store the MAC T in the memory 124 or in any other location accessible during execution of the counter mode encryption operation. After generating the MAC T, the method 400 is completed. After completing the CBC-MAC authentication operation, the computing device 100 may continue to perform the CCM encryption operation as described in connection with FIG. 3.

Figure 5:
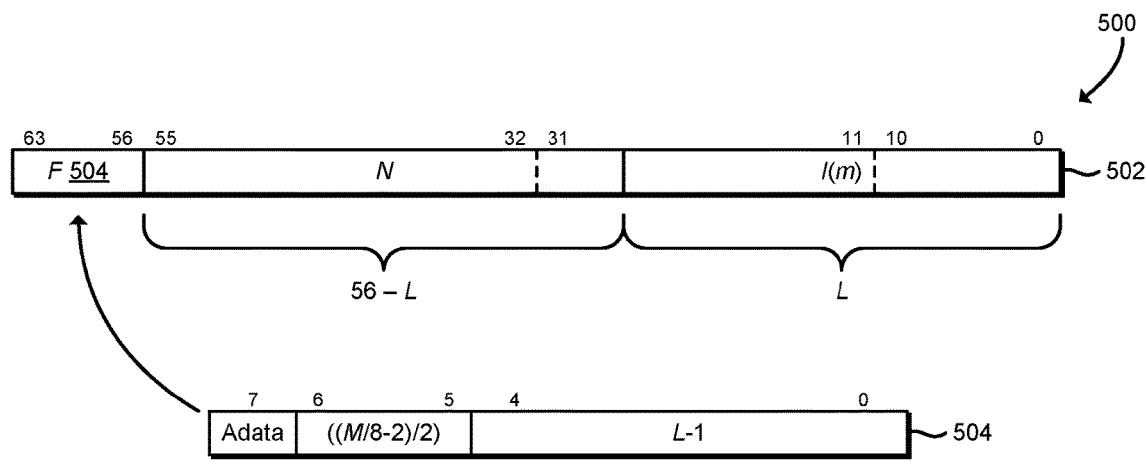
FIG. 5 is a schematic diagram illustrating an authentication block that may be generated by the computing device of FIGS. 1 and 2.

Referring now to FIG. 5, diagram 500 illustrates one potential embodiment of an authentication block $B_0$ 502. As shown, the authentication block $B_0$ 502 is a 64-bit data block that includes an 8-bit flag field F 504, a nonce N field, and a length l(m) field. The length l(m) field is included in the least-significant L bits of the authentication block $B_0$ 502, and may be between 11 and 32 bits in size, inclusive. The nonce field N is included in the middle bits of the authentication block $B_0$ 502 and is thus 56–L bits in length. The flag field F 504 is included in the most-significant 8 bits of the authentication block $B_0$ 502. As shown, the flag field F 504 includes an Adata field in the most-significant bit, an M field in the next two bits, and an L field in the least-significant 5 bits. The Adata field is '1' if the additional authenticated data a 208 is present—that is, if the length l(a) is greater than zero—and the Adata field is '0' if the length l(a) equals zero. The length M of the authentication tag U 214 is encoded in the M field as the result of the Expression 3, illustrated below. Valid values for the M field include '01', '10', and '11', and the value '00' is reserved. Thus, the length M of the authentication tag U 214 may be 32, 48, or 64 bits. Similarly, the length L is encoded in the L field as the result of the expression L−1. As described above, L may be between 11 and 32, inclusive. Values of the L field for values of L less than 11 are reserved.

$$\frac{\frac{M}{8} - 2}{2} \qquad (3)$$

Figure 6:
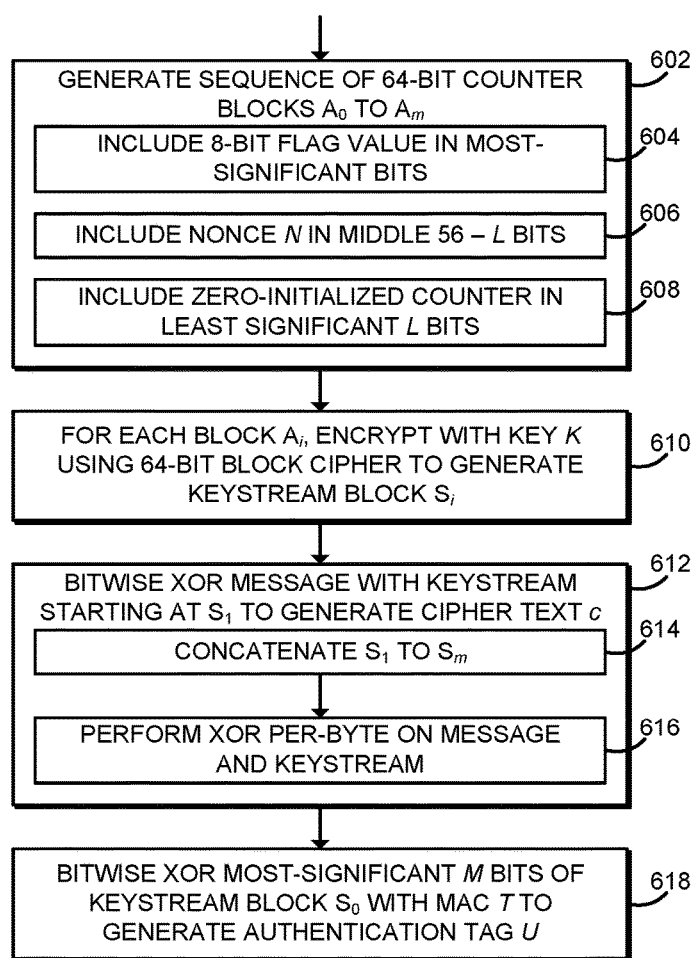
FIG. 6 is a simplified flow diagram of at least one embodiment of a method for message encryption that may be executed by the computing device of FIGS. 1 and 2.

Referring now to FIG. 6, in use, the computing device 100 may execute a method 600 for counter mode encryption. The method 600 may be executed, for example, in connection with block 316 of FIG. 3, as described above. It should be appreciated that, in some embodiments, the operations of the method 600 may be performed by one or more modules of the environment 200 of the computing device 100 as shown in FIG. 2. The method 600 begins in block 602, in which the computing device 100 generates a sequence of 64-bit counter blocks $A_0$ to $A_m$. Each counter block $A_i$ includes a flag field F, the nonce N, and a counter value. One potential embodiment of a counter block $A_i$ is described below in connection with FIG. 7. In block 604, the computing device 100 includes an 8-bit flag field F in the most-significant 8 bits of the counter block $A_i$. The flag field F includes three most-significant bits that are set to zero, meaning that every counter block $A_i$ is different from an authentication block $B_i$. The flag field F is also indicative of the number of bits L in the length l(m) field. In block 606, the computing device 100 includes the nonce N in the middle 56–L bits of the counter block $A_i$. The same nonce N is used for both the CBC-MAC authentication operation and the counter mode encryption operation. In block 608, the computing device 100 includes a zero-initialized counter field in the least-significant L bits of each counter block $A_i$. That is, the computing device 100 includes a value of zero in the counter field for the counter block $A_0$, a value of one in the counter field for the counter block $A_1$, and so on, up to counter block $A_m$.

In block 610, the computing device 100 encrypts each counter block $A_i$ with the encryption key K 206 to generate a corresponding keystream block $S_i$. Each keystream block $S_i$ may be embodied as a 64-bit block of data. The encryption operation performed on each counter block $A_i$ is illustrated by Equation 4, below. The function $E_{64}$ represents the 64-bit block cipher, which is the same 64-bit block cipher used in the CBC-MAC authentication operation. As shown, the encryption key K 206 and the counter block $A_i$ are input as parameters to the 64-bit block cipher $E_{64}$. Thus, the computing device 100 generates a keystream including the sequence of keystream blocks $S_0$ to $S_m$.

$$S_i = E_{64}(K, A_i) \qquad (4)$$

In block 612, the computing device 100 bitwise XORs the message m 210 with the keystream starting at block $S_1$ to generate the cipher text c 212. Note that the keystream block $S_0$ is not used to generate the cipher text c 212. The computing device 100 may perform the XOR operation on each byte of the message m 210 and corresponding byte from the keystream. In block 614, the computing device 100 may concatenate the keystream blocks $S_1$ to $S_m$ to generate a sequence of keystream bytes s. In block 616, the computing device 100 may perform an XOR operation per-byte on the message m 210 and the sequence of keystream bytes s. For example, the computing device 100 may perform an operation as illustrated by Equation 5, below. Accordingly, the computing device 100 may not zero-pad or partition the message m 210 into 64-bit blocks to perform the counter mode encryption operation.

$$c_j = m_j \oplus s_j, \text{ where } 0 \leq j < l(m) \qquad (5)$$

In block 618, the computing device 100 bitwise XORs the most-significant M bits of the keystream block $S_0$ with the MAC T to generate the authentication tag U 214. As described above, the authentication tag U 214 may be used to verify the cipher text c 212. After generating the cipher text c 212 and the authentication tag U 214, the method 600 is completed. After completing the counter mode encryption operation, the computing device 100 may output the results as described in connection with FIG. 3.

Figure 7:
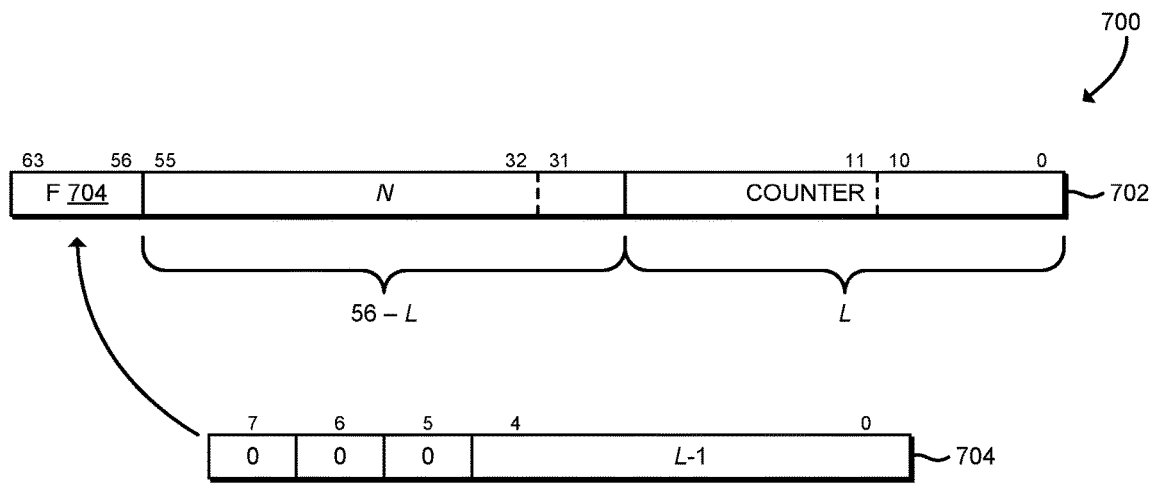
FIG. 7 is a schematic diagram illustrating a counter block that may be generated by the computing device of FIGS. 1 and 2.

Referring now to FIG. 7, diagram 700 illustrates one potential embodiment of a counter block $A_i$ 702. As shown, the counter block $A_i$ 702 is a 64-bit data block that includes an 8-bit flag field F 704, a nonce N field, and a zero-initialized counter field. Similar to the length l(m) field of the authentication block $B_0$, the zero-initialized counter field is included in the least-significant L bits of the counter block $A_i$ 702, and may be between 11 and 32 bits in size, inclusive. The nonce field N is included in the middle bits of the counter block $A_i$ 702 and is thus 56–L bits in length. The flag field F 704 is included in the eight most-significant bits of the counter block $A_i$ 702. As shown, the flag field F 704 includes three most-significant bits that must be zero and an L field in the least-significant 5 bits. Similar to the authentication block $B_0$, the length L is encoded in the L field as the result of the expression L−1. As described above, L may be between 11 and 32, inclusive. Values of the L field for values of L less than 11 are reserved.

Although illustrated as performing an encryption operation to encrypt a message m 210 into a cipher text c 212, it should be understood that the technologies described herein may also be used to decrypt a cipher text c 212 into a message m 210. For example, to decrypt the cipher text c 214, the computing device 100 may generate the keystream as described above in connection with blocks 602 through 610 of FIG. 6 and then bitwise XOR the cipher text c 214 with the keystream starting at keystream block $S_1$ to generate the message m 210. Similarly, to verify the authentication tag U 216, the computing device 100 may bitwise XOR the most significant M bits of the keystream block $S_0$ with the authentication tag U 216 to generate the MAC T, and then the computing device 100 may compare the MAC T to a MAC generated by performing the CBC-MAC authentication operation as described above in connection with FIG. 4.

It should be appreciated that, in some embodiments, the methods 300, 400, and/or 600 may be embodied as various instructions stored on a computer-readable media, which may be executed by the processor 120 and/or other components of the computing device 100 to cause the computing device 100 to perform the respective method 300, 400, and/or 600. The computer-readable media may be embodied as any type of media capable of being read by the computing device 100 including, but not limited to, the memory 124, the data storage device 126, firmware devices, other memory or data storage devices of the computing device 100, portable media readable by a peripheral device 130 of the computing device 100, and/or other media.

EXAMPLES

Illustrative examples of the technologies disclosed herein are provided below. An embodiment of the technologies may include any one or more, and any combination of, the examples described below.

Example 1 includes a computing device for message encryption, the computing device comprising: an authentication module to perform a cipher block chaining message authentication code (CBC-MAC) authentication operation on a message with an encryption key using a 64-bit block cipher to generate a message authentication code, wherein to perform the CBC-MAC authentication operation comprises to format the message into one or more 64-bit authentication blocks; and an encryption module to (i) perform a counter mode encryption operation on the message with the encryption key using the 64-bit block cipher to generate a cipher text, wherein to perform the counter mode encryption comprises to generate a plurality of 64-bit keystream blocks, and (ii) generate an authentication tag based on the message authentication code and a first keystream block of the plurality of 64-bit keystream blocks.

Example 2 includes the subject matter of Example 1, and wherein to perform the CBC-MAC authentication operation further comprises to perform the CBC-MAC authentication operation on the message and on authentication data to generate the message authentication code.

Example 3 includes the subject matter of any of Examples 1 and 2, and wherein to perform the CBC-MAC authentication operation further comprises to format the additional authentication data into one or more 64-bit authentication blocks.

Example 4 includes the subject matter of any of Examples 1-3, and wherein to perform the CBC-MAC authentication operation comprises to generate a first 64-bit authentication block, wherein the first 64-bit authentication block includes a flag field F, a nonce field N, and a message length field l(m), wherein the message length field l(m) is indicative of a length of the message in bytes, and wherein the flag field F has a length of 8 bits, the message length field l(m) has a length L of between 11 and 32 bits, inclusive, and the nonce field N has a length of 56 minus the length L bits.

Example 5 includes the subject matter of any of Examples 1-4, and wherein the flag field F of the first 64-bit authentication block includes an authentication tag length M field and a length L field.

Example 6 includes the subject matter of any of Examples 1-5, and wherein the authentication tag length M field comprises a two-bit field, wherein valid values for the authentication tag length M include 64, 48, and 32, and wherein the authentication tag length M field is encoded as the value of an expression:

$$\frac{\frac{M}{8}-2}{2}.$$

Example 7 includes the subject matter of any of Examples 1-6, and wherein to generate the authentication tag comprises to perform a bitwise XOR operation with a first M bits of the first keystream block and a first M bits of the message authentication code to generate the authentication tag.

Example 8 includes the subject matter of any of Examples 1-7, and wherein the length L field comprises a five-bit field encoded as the value of an expression L−1.

Example 9 includes the subject matter of any of Examples 1-8, and wherein to perform the CBC-MAC authentication operation comprises to: encrypt the first 64-bit authentication block with the encryption key using the 64-bit block cipher to generate an encrypted block corresponding to the first 64-bit authentication block; and for each remaining 64-bit authentication block of the plurality of 64-bit authentication blocks, perform a bitwise XOR operation with the remaining 64-bit authentication block and an encrypted block corresponding to a previous 64-bit authentication block to generate an XOR result and encrypt the XOR result to generate an encrypted block corresponding to the remaining 64-bit authentication block.

Example 10 includes the subject matter of any of Examples 1-9, and wherein to perform the counter mode encryption operation comprises to: generate a plurality of 64-bit counter blocks; and encrypt each 64-bit counter block to generate a corresponding 64-bit keystream block.

Example 11 includes the subject matter of any of Examples 1-10, and wherein each of the 64-bit counter blocks includes a flag field F, a nonce field N, and a zero-initialized counter field, wherein the flag field F has a length of 8 bits, the counter field has a length L of between 11 and 32 bits, inclusive, and the nonce field N has a length of 56 minus the length L bits.

Example 12 includes the subject matter of any of Examples 1-11, and wherein the flag field F includes three most-significant bits that must be zero and a five-bit length L field, wherein the length L field is encoded as the value of an expression L−1.

Example 13 includes the subject matter of any of Examples 1-12, and wherein to perform the counter mode encryption operation further comprises to perform a bitwise XOR operation with each byte of the message and a corresponding byte of the plurality of 64-bit keystream blocks that starts with a second 64-bit keystream block of the plurality of 64-bit keystream blocks.

Example 14 includes the subject matter of any of Examples 1-13, and wherein: to perform the counter mode encryption operation further comprises to concatenate the second 64-bit keystream block and the remaining 64-bit keystream blocks of the plurality of keystream blocks; and to perform the bitwise XOR operation comprises to perform the bitwise XOR operation in response to concatenation of the second 64-bit keystream block and the remaining 64-bit keystream blocks.

Example 15 includes the subject matter of any of Examples 1-14, and wherein to generate the authentication tag comprises to perform a bitwise XOR operation with the first keystream block and the message authentication code to generate the authentication tag.

Example 16 includes a method for message encryption, the method comprising: performing, by a computing device, a cipher block chaining message authentication code (CBC-MAC) authentication operation on a message with an encryption key using a 64-bit block cipher to generate a message authentication code, wherein performing the CBC-MAC authentication operation comprises formatting the message into one or more 64-bit authentication blocks; performing, by the computing device, a counter mode encryption operation on the message with the encryption key using the 64-bit block cipher to generate a cipher text, wherein performing the counter mode encryption comprises generating a plurality of 64-bit keystream blocks; and generating, by the computing device, an authentication tag based on the message authentication code and a first keystream block of the plurality of 64-bit keystream blocks.

Example 17 includes the subject matter of Example 16, and wherein performing the CBC-MAC authentication operation further comprises performing the CBC-MAC authentication operation on the message and on authentication data to generate the message authentication code.

Example 18 includes the subject matter of any of Examples 16 and 17, and wherein performing the CBC-MAC authentication operation further comprises formatting the additional authentication data into one or more 64-bit authentication blocks.

Example 19 includes the subject matter of any of Examples 16-18, and wherein performing the CBC-MAC authentication operation comprises generating a first 64-bit authentication block, wherein the first 64-bit authentication block includes a flag field F, a nonce field N, and a message length field l(m), wherein the message length field l(m) is indicative of a length of the message in bytes, and wherein the flag field F has a length of 8 bits, the message length field l(m) has a length L of between 11 and 32 bits, inclusive, and the nonce field N has a length of 56 minus the length L bits.

Example 20 includes the subject matter of any of Examples 16-19, and wherein the flag field F of the first 64-bit authentication block includes an authentication tag length M field and a length L field.

Example 21 includes the subject matter of any of Examples 16-20, and wherein the authentication tag length M field comprises a two-bit field, wherein valid values for the authentication tag length M include 64, 48, and 32, and wherein the authentication tag length M field is encoded as the value of an expression:

$$\frac{\frac{M}{8}-2}{2}.$$

Example 22 includes the subject matter of any of Examples 16-21, and wherein generating the authentication tag comprises performing a bitwise XOR operation with a first M bits of the first keystream block and a first M bits of the message authentication code to generate the authentication tag.

Example 23 includes the subject matter of any of Examples 16-22, and wherein the length L field comprises a five-bit field encoded as the value of an expression L−1.

Example 24 includes the subject matter of any of Examples 16-23, and wherein performing the CBC-MAC authentication operation comprises: encrypting the first 64-bit authentication block with the encryption key using the 64-bit block cipher to generate an encrypted block corresponding to the first 64-bit authentication block; and for each remaining 64-bit authentication block of the plurality of 64-bit authentication blocks, performing a bitwise XOR operation with the remaining 64-bit authentication block and an encrypted block corresponding to a previous 64-bit authentication block to generate an XOR result and encrypting the XOR result to generate an encrypted block corresponding to the remaining 64-bit authentication block.

Example 25 includes the subject matter of any of Examples 16-24, and wherein performing the counter mode encryption operation comprises: generating a plurality of 64-bit counter blocks; and encrypting each 64-bit counter block to generate a corresponding 64-bit keystream block.

Example 26 includes the subject matter of any of Examples 16-25, and wherein each of the 64-bit counter blocks includes a flag field F, a nonce field N, and a zero-initialized counter field, wherein the flag field F has a length of 8 bits, the counter field has a length L of between 11 and 32 bits, inclusive, and the nonce field N has a length of 56 minus the length L bits.

Example 27 includes the subject matter of any of Examples 16-26, and wherein the flag field F includes three most-significant bits that must be zero and a five-bit length L field, wherein the length L field is encoded as the value of an expression L−1.

Example 28 includes the subject matter of any of Examples 16-27, and wherein performing the counter mode encryption operation further comprises performing a bitwise XOR operation with each byte of the message and a corresponding byte of the plurality of 64-bit keystream blocks starting with a second 64-bit keystream block of the plurality of 64-bit keystream blocks.

Example 29 includes the subject matter of any of Examples 16-28, and wherein: performing the counter mode encryption operation further comprises concatenating the second 64-bit keystream block and the remaining 64-bit keystream blocks of the plurality of keystream blocks; and performing the bitwise XOR operation comprises performing the bitwise XOR operation in response to concatenating the second 64-bit keystream block and the remaining 64-bit keystream blocks.

Example 30 includes the subject matter of any of Examples 16-29, and wherein generating the authentication tag comprises performing a bitwise XOR operation with the first keystream block and the message authentication code to generate the authentication tag.

Example 31 includes a computing device comprising: a processor; and a memory having stored therein a plurality of instructions that when executed by the processor cause the computing device to perform the method of any of Examples 16-30.

Example 32 includes one or more machine readable storage media comprising a plurality of instructions stored thereon that in response to being executed result in a computing device performing the method of any of Examples 16-30.

Example 33 includes a computing device comprising means for performing the method of any of Examples 16-30.

Example 34 includes a computing device for message encryption, the computing device comprising: means for performing a cipher block chaining message authentication code (CBC-MAC) authentication operation on a message with an encryption key using a 64-bit block cipher to generate a message authentication code, wherein performing the CBC-MAC authentication operation comprises formatting the message into one or more 64-bit authentication blocks; means for performing a counter mode encryption operation on the message with the encryption key using the 64-bit block cipher to generate a cipher text, wherein performing the counter mode encryption comprises generating a plurality of 64-bit keystream blocks; and means for generating an authentication tag based on the message authentication code and a first keystream block of the plurality of 64-bit keystream blocks.

Example 35 includes the subject matter of Example 34, and wherein the means for performing the CBC-MAC authentication operation further comprises means for performing the CBC-MAC authentication operation on the message and on authentication data to generate the message authentication code.

Example 36 includes the subject matter of any of Examples 34 and 35, and wherein the means for performing the CBC-MAC authentication operation further comprises means for formatting the additional authentication data into one or more 64-bit authentication blocks.

Example 37 includes the subject matter of any of Examples 34-36, and wherein the means for performing the CBC-MAC authentication operation comprises means for generating a first 64-bit authentication block, wherein the first 64-bit authentication block includes a flag field F, a nonce field N, and a message length field l(m), wherein the message length field l(m) is indicative of a length of the message in bytes, and wherein the flag field F has a length of 8 bits, the message length field l(m) has a length L of between 11 and 32 bits, inclusive, and the nonce field N has a length of 56 minus the length L bits.

Example 38 includes the subject matter of any of Examples 34-37, and wherein the flag field F of the first 64-bit authentication block includes an authentication tag length M field and a length L field.

Example 39 includes the subject matter of any of Examples 34-38, and wherein the authentication tag length M field comprises a two-bit field, wherein valid values for the authentication tag length M include 64, 48, and 32, and wherein the authentication tag length M field is encoded as the value of an expression:

$$\frac{\frac{M}{8}-2}{2}.$$

Example 40 includes the subject matter of any of Examples 34-39, and wherein the means for generating the authentication tag comprises means for performing a bitwise XOR operation with a first M bits of the first keystream block and a first M bits of the message authentication code to generate the authentication tag.

Example 41 includes the subject matter of any of Examples 34-40, and wherein the length L field comprises a five-bit field encoded as the value of an expression L−1.

Example 42 includes the subject matter of any of Examples 34-41, and wherein the means for performing the CBC-MAC authentication operation comprises: means for encrypting the first 64-bit authentication block with the encryption key using the 64-bit block cipher to generate an encrypted block corresponding to the first 64-bit authentication block; and for each remaining 64-bit authentication block of the plurality of 64-bit authentication blocks, means for performing a bitwise XOR operation with the remaining 64-bit authentication block and an encrypted block corresponding to a previous 64-bit authentication block to generate an XOR result and encrypting the XOR result to generate an encrypted block corresponding to the remaining 64-bit authentication block.

Example 43 includes the subject matter of any of Examples 34-42, and wherein the means for performing the counter mode encryption operation comprises: means for generating a plurality of 64-bit counter blocks; and means for encrypting each 64-bit counter block to generate a corresponding 64-bit keystream block.

Example 44 includes the subject matter of any of Examples 34-43, and wherein each of the 64-bit counter blocks includes a flag field F, a nonce field N, and a zero-initialized counter field, wherein the flag field F has a length of 8 bits, the counter field has a length L of between 11 and 32 bits, inclusive, and the nonce field N has a length of 56 minus the length L bits.

Example 45 includes the subject matter of any of Examples 34-44, and wherein the flag field F includes three most-significant bits that must be zero and a five-bit length L field, wherein the length L field is encoded as the value of an expression L−1.

Example 46 includes the subject matter of any of Examples 34-45, and wherein the means for performing the counter mode encryption operation further comprises means for performing a bitwise XOR operation with each byte of the message and a corresponding byte of the plurality of 64-bit keystream blocks starting with a second 64-bit keystream block of the plurality of 64-bit keystream blocks.

Example 47 includes the subject matter of any of Examples 34-46, and wherein: the means for performing the counter mode encryption operation further comprises means for concatenating the second 64-bit keystream block and the remaining 64-bit keystream blocks of the plurality of keystream blocks; and the means for performing the bitwise XOR operation comprises means for performing the bitwise XOR operation in response to concatenating the second 64-bit keystream block and the remaining 64-bit keystream blocks.

Example 48 includes the subject matter of any of Examples 34-47, and wherein the means for generating the authentication tag comprises means for performing a bitwise XOR operation with the first keystream block and the message authentication code to generate the authentication tag.

The invention claimed is:
1. A computing device for message encryption, the computing device comprising:

an authentication module to perform a cipher block chaining message authentication code (CBC-MAC) authentication operation on a message with an encryption key using a 64-bit block cipher to generate a message authentication code, wherein to perform the CBC-MAC authentication operation comprises to format the message into one or more 64-bit authentication blocks; and an encryption module to (i) perform a counter mode encryption operation on the message with the encryption key using the 64-bit block cipher to generate a cipher text, wherein to perform the counter mode encryption operation comprises to generate a plurality of 64-bit keystream blocks, and (ii) generate an authentication tag based on the message authentication code and a first keystream block of the plurality of 64-bit keystream blocks;

wherein to perform the CBC-MAC authentication operation comprises to generate a first 64-bit authentication block, wherein the first 64-bit authentication block includes a flag field F, a nonce field N, and a message length field l(m), wherein the message length field l(m) is indicative of a length of the message in bytes, and wherein the flag field F has a length of 8 bits, the message length field l(m) has a length L of between 11 and 32 bits, inclusive, and the nonce field N has a length of 56 minus the length L bits.

2. The computing device of claim 1, wherein the flag field F of the first 64-bit authentication block includes an authentication tag length M field and a length L field.

3. The computing device of claim 2, wherein the authentication tag length M field comprises a two-bit field, wherein valid values for the authentication tag length M include 64 bits, 48 bits, and 32 bits, and wherein the authentication tag length M field is encoded as the value of an expression:

$$\frac{\frac{M}{8}-2}{2}.$$

4. The computing device of claim 2, wherein to generate the authentication tag comprises to perform a bitwise XOR operation with a first M bits of the first keystream block and a first M bits of the message authentication code to generate the authentication tag.

5. The computing device of claim 2, wherein the length L field comprises a five-bit field encoded as the value of an expression L−1.

6. The computing device of claim 1, wherein to perform the counter mode encryption operation comprises to:
generate a plurality of 64-bit counter blocks; and
encrypt each of the plurality of 64-bit counter blocks to generate a corresponding 64-bit keystream block.

7. The computing device of claim 6, wherein the each of the plurality of 64-bit counter blocks includes a flag field F, a nonce field N, and a zero-initialized counter field, wherein the flag field F of the each of the plurality of 64-bit counter blocks has a length of 8 bits, the counter field of the each of the plurality of 64-bit counter blocks has a length L of between 11 and 32 bits, inclusive, and the nonce field N of the each of the plurality of 64-bit counter blocks has a length of 56 minus the length L bits.

8. The computing device of claim 7, wherein the flag field F of the each of the plurality of 64-bit counter blocks includes three most-significant bits that must be zero and a five-bit length L field, wherein the five-bit length L field is encoded as the value of an expression L−1.

9. The computing device of claim 1, wherein to generate the authentication tag comprises to perform a bitwise XOR operation with the first keystream block and the message authentication code to generate the authentication tag.

10. A method for message encryption, the method comprising:
performing, by a computing device, a cipher block chaining message authentication code (CBC-MAC) authentication operation on a message with an encryption key using a 64-bit block cipher to generate a message authentication code, wherein performing the CBC-MAC authentication operation comprises formatting the message into one or more 64-bit authentication blocks;
performing, by the computing device, a counter mode encryption operation on the message with the encryption key using the 64-bit block cipher to generate a cipher text, wherein performing the counter mode encryption operation comprises generating a plurality of 64-bit keystream blocks; and
generating, by the computing device, an authentication tag based on the message authentication code and a first keystream block of the plurality of 64-bit keystream blocks;
wherein performing the CBC-MAC authentication operation comprises generating a first 64-bit authentication block, wherein the first 64-bit authentication block includes a flag field F, a nonce field N, and a message length field l(m), wherein the message length field l(m) is indicative of a length of the message in bytes, and wherein the flag field F has a length of 8 bits, the message length field l(m) has a length L of between 11 and 32 bits, inclusive, and the nonce field N has a length of 56 minus the length L bits.

11. The method of claim 10, wherein the flag field F of the first 64-bit authentication block includes an authentication tag length M field and a length L field.

12. The method of claim 11, wherein the length L field comprises a five-bit field encoded as the value of an expression L−1.

13. The method of claim 10, wherein performing the counter mode encryption operation comprises:
generating a plurality of 64-bit counter blocks; and
encrypting each of the plurality of 64-bit counter blocks to generate a corresponding 64-bit keystream block.

14. The method of claim 13, wherein the each of the plurality of 64-bit counter blocks includes a flag field F, a nonce field N, and a zero-initialized counter field, wherein the flag field F of the each of the plurality of 64-bit counter blocks has a length of 8 bits, the counter field of the each of the plurality of 64-bit counter blocks has a length L of between 11 and 32 bits, inclusive, and the nonce field N of the each of the plurality of 64-bit counter blocks has a length of 56 minus the length L bits.

15. The method of claim 14, wherein the flag field F of the each of the plurality of 64-bit counter blocks includes three most-significant bits that must be zero and a five-bit length L field, wherein the five-bit length L field is encoded as the value of an expression L−1.

16. One or more non-transitory, computer-readable storage media comprising a plurality of instructions that in response to being executed cause a computing device to:
perform a cipher block chaining message authentication code (CBC-MAC) authentication operation on a message with an encryption key using a 64-bit block cipher to generate a message authentication code, wherein performing the CBC-MAC authentication operation comprises formatting the message into one or more 64-bit authentication blocks;

perform a counter mode encryption operation on the message with the encryption key using the 64-bit block cipher to generate a cipher text, wherein performing the counter mode encryption operation comprises generating a plurality of 64-bit keystream blocks; and generate an authentication tag based on the message authentication code and a first keystream block of the plurality of 64-bit keystream blocks;

wherein to perform the CBC-MAC authentication operation comprises to generate a first 64-bit authentication block, wherein the first 64-bit authentication block includes a flag field F, a nonce field N, and a message length field l(m), wherein the message length field l(m) is indicative of a length of the message in bytes, and wherein the flag field F has a length of 8 bits, the message length field l(m) has a length L of between 11 and 32 bits, inclusive, and the nonce field N has a length of 56 minus the length L bits.

17. The one or more non-transitory, computer-readable storage media of claim 16, wherein the flag field F of the first 64-bit authentication block includes an authentication tag length M field and a length L field.

18. The one or more non-transitory, computer-readable storage media of claim 17, wherein the authentication tag length M field comprises a two-bit field, wherein valid values for the authentication tag length M include 64 bits, 48 bits, and 32 bits, and wherein the authentication tag length M field is encoded as the value of an expression:

$$\frac{\frac{M}{8}-2}{2}.$$

19. The one or more non-transitory, computer-readable storage media of claim 17, wherein the length L field comprises a five-bit field encoded as the value of an expression L−1.

20. The one or more non-transitory, computer-readable storage media of claim 16, wherein to perform the counter mode encryption operation comprises to:

generate a plurality of 64-bit counter blocks; and
encrypt each of the plurality of 64-bit counter blocks to generate a corresponding 64-bit keystream block.

21. The one or more non-transitory, computer-readable storage media of claim 20, wherein the each of the plurality of 64-bit counter blocks includes a flag field F, a nonce field N, and a zero-initialized counter field, wherein the flag field F of the each of the plurality of 64-bit counter blocks has a length of 8 bits, the counter field of the each of the plurality of 64-bit counter blocks has a length L of between 11 and 32 bits, inclusive, and the nonce field N of the each of the plurality of 64-bit counter blocks has a length of 56 minus the length L bits.

22. The one or more non-transitory, computer-readable storage media of claim 21, wherein the flag field F of the each of the plurality of 64-bit counter blocks includes three most-significant bits that must be zero and a five-bit length L field, wherein the five-bit length L field is encoded as the value of an expression L −1.

\* \* \* \* \*